Oct. 6, 1959   G. H. YELINEK ET AL   2,907,121
FILTER DEMONSTRATOR
Filed March 31, 1958
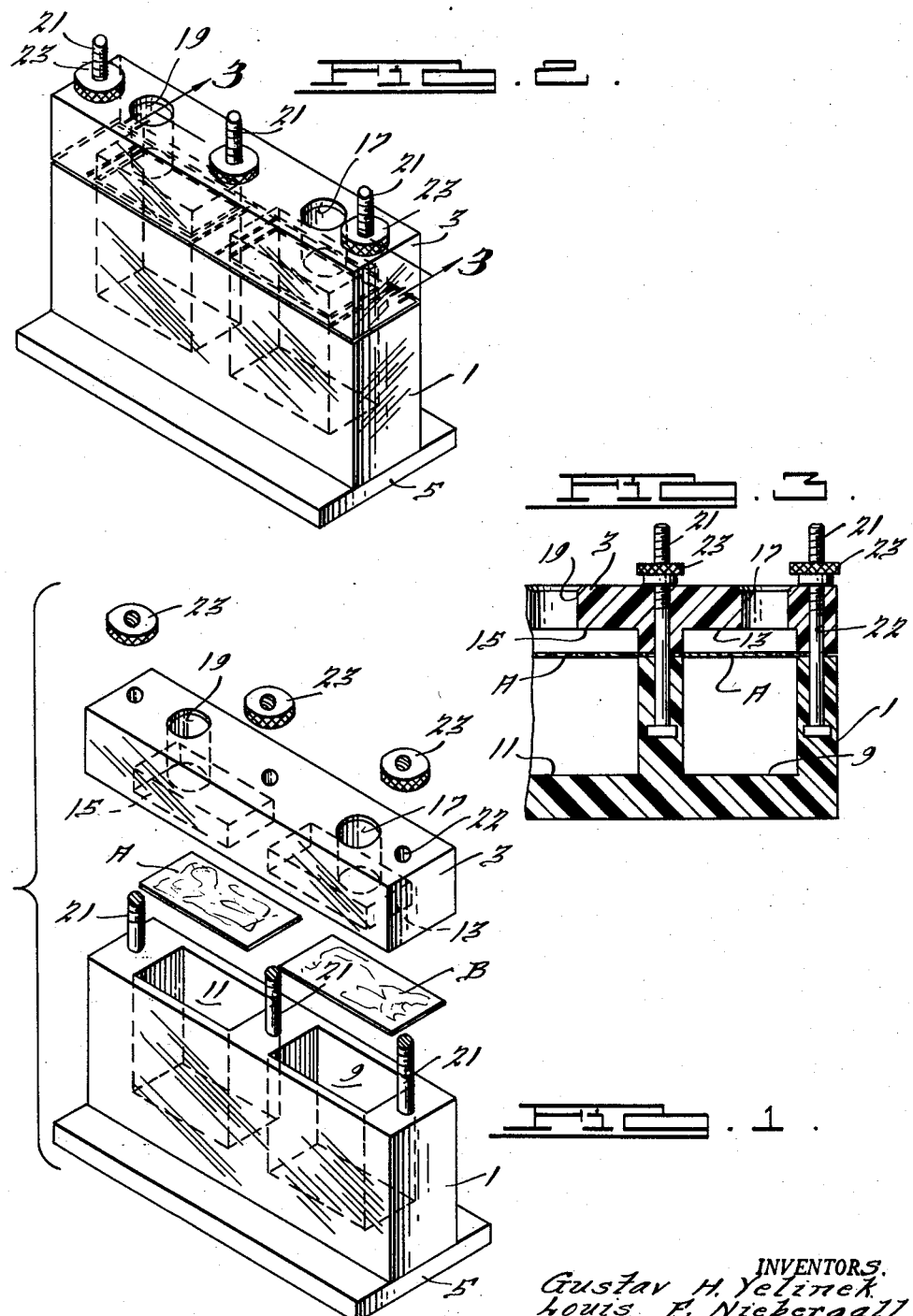
INVENTORS.
Gustav H. Yelinek
Louis F. Niebergall
La Vern R. Tietz
BY
Harness, Dickey & Pierce
ATTORNEYS United States Patent Office 2,907,121
Patented Oct. 6, 1959

2,907,121

FILTER DEMONSTRATOR

Gustav H. Yelinek, Louis F. Niebergall, and La Vern R. Tietz, Racine, Wis., assignors to Walker Manufacturing Company of Wisconsin, Racine, Wis., a corporation of Wisconsin Application March 31, 1958, Serial No. 725,375

1 Claim. (Cl. 35—13)

Our invention relates to comparative testing devices which visually demonstrate the difference between two articles being tested. In particular, our invention refers to a means for the comparative testing of different types of filter elements.

The invention is useful in demonstrating the comparative effectiveness of filtering elements such as the filter paper used in present-day filter cartridges for automotive type filters.

The invention comprises a device in which the filter elements may be mounted in side by side relationship and contaminated liquid forced through each. Disposed on the down stream side of each of the filter elements are reservoirs or collection chambers to receive the liquid that has passed through the filter elements. The reservoirs are formed in transparent bodies and located adjacent to each other so that the difference in color or clarity of the liquid in adjacent reservoirs furnishes a visual comparison of the effectiveness of the respective filter elements.

The invention is illustrated in a preferred form in the accompanying drawing in which Figure 1 is a perspective view, with the parts in a more or less exploded relationship, of a device embodying the invention;

Fig. 2 is a perspective view of the device in assembled condition; and

Fig. 3 is a section along line 3—3 of Fig. 2.

The improved comparative testing device comprises a base or body 1 and a head or cover 3 which fits over the body 1. If desired to provide stability, a plate 5 may be attached to the bottom of the body 1. The body 1 and the head 3 are each preferably formed of transparent material such as glass or a transparent plastic material such as "Lucite." The body has a pair of cavities or reservoirs 9 and 11 formed in it which open out of the top face of the body. These are located side by side as can be easily seen in the drawing. Located in alignment with the reservoirs 9 and 11 are cavities or sumps 13 and 15 which open out of the bottom face of the head 3 and in alignment with the reservoirs 9 and 11. Extending into the top portion of each of the sumps 13 and 15 are inlet holes 17 and 19 which open out of the top face of the cover 3.

The cover 3 is mounted on rods 21, which are preferably embedded within the body 1, the rods slidably extending through suitable apertures 22 in the cover. Knurled nuts 23 thread on the rods 21 and when tightened will bear against the top of the cover 3 to clamp it tightly against the top of the body 1.

In using the device that has just been described, two different pieces of filter element or filter paper A and B are laid over the respective cavities 9 and 11 on the top face of the base 1. The cover 3 is then brought into contact with the top of the pieces A and B and clamped tightly in place by turning of the nuts 23, thus also clamping the filter elements in a fluid tight joint. After this has been done, contaminated liquid, such as oil, is poured into both openings 17 and 19 to fill the sumps 13 and 15. Then, by gravity, the contaminated liquid will flow through the respective filter elements A and B and into the reservoirs 9 and 11. Since the body 1 is transparent it will be easy to look through the side thereof into the cavities 9 and 11 and tell by the clarity of the liquid therein what the comparative filtering abilities of the two filter elements are. If desired, a squeeze bulb of a type available on the open market can be placed over the holes 17 or 19 and compression applied to it so as to raise the pressure in the holes and in the sump 13 and 15 to induce a pressure flow through the filter elements.

While the body and cover are preferably made of transparent material, it is clear that certain advantages of the invention can be obtained if only one side of the body is transparent. Other changes in the specific structure illustrated may be made without departing from the spirit and scope of the invention.

We claim:

A test device for indicating the comparative filtering ability of a pair of filtering elements comprising a base having a flat top surface and a pair of cavities located side by side and opening into said top surface, at least one side of the base being transparent to permit visual inspection of the cavities, a cover having a flat bottom surface for fitting over said top surface on the base and holding a pair of filter elements to be tested over the respective cavities, sumps opening out of the bottom surface of the cover and of the same cross sectional size and shape as the opening of the cavities in the top face of the base and in alignment therewith, rod means supporting the cover on the base so that the sumps are in alignment with the cavities in the base, inlet openings in the cover opening out of the top face thereof and connecting it with the sumps, and means on said rod means for clamping the cover against the base.

References Cited in the file of this patent

UNITED STATES PATENTS

| D. 161,651 | Rosche | Jan. 16, 1951 |
| D. 174,825 | McIntyre | May 24, 1955 |
| 2,781,312 | Klumb et al. | Feb. 12, 1957 |
| 2,789,689 | Lewis | Apr. 23, 1957 |
| 2,836,772 | Wintrode | May 27, 1958 |